United States Patent Office 3,506,763
Patented Apr. 14, 1970

3,506,763
METHOD OF PROMOTING GROWTH OF ANIMALS WITH TESTOLOLACTONES
Leonard J. Lerner, New Brunswick, N.J., assignor to E. R. Squibb & Sons, Inc., New York, N.Y., a corporation of Delaware
No Drawing. Continuation-in-part of application Ser. No. 371,071, Oct. 17, 1963. This application Dec. 20, 1965, Ser. No. 515,146
Int. Cl. A61k 27/00
U.S. Cl. 424—244
6 Claims

ABSTRACT OF THE DISCLOSURE

The administration of small, but effective doses of non-androgenic testololactones such as testololactone, $\Delta^1$-testololactone, A-nortestololactone or their simple derivatives prior to birth or to the newborn animal shortly after birth stimulates general body growth and maturation without virilization or adverse anabolic effects in the weaned or adult animal.

---

This application is a continuation-in-part of application Ser. No. 371,071, filed Oct. 17, 1963, now abandoned.

This invention relates to a novel method for promoting the growth and development of animals. More particularly, the invention relates to a novel method of treating animals to increase their overall body weight and size and enhance their development and growth pattern by the administration of small but effective amounts of novel growth promoting compositions.

Since the newborn animal is in the greatest growth phase of its extra uterine life, it would be reasonable to assume that growth promotion agents have the least effect at that period of development. However, it is unexpected to discover that the weight curves of newborn animals can be drastically altered and the growth pattern substantially increased by administering to the mother prior to delivery or to the newborn animal a relatively small dosage of a particular class of promoting agents. The growth promoting agents which have been found to be effective in this respect are non-androgenic, steroid-like compounds having a testololactone structure. These include testololactone, $\Delta^1$-testololactone and A-nortestololactone as well as their simple derivatives.

It has been observed that androgenic steroids, like testosterone which effect growth stimulation in the weaning or adult animal, when administered in the prenatal or neonatal periods, have detrimental effects on the newborn animal. That is, when administered to the pregnant mother, the offspring are virilized, and when administered to the newborn animal, the animal is rendered permanently sterile upon maturity. The growth promoting effect in the adult animals resulting from administration of the androgenic steroids is primarily associated with only the accessory sex organs and those muscles which are important with sexual or mating activity.

It has now been found, however, that when small but effective doses of the steroid-like compounds used according to this invention are administered to the pregnant mother in the latter half of pregnancy or to the newborn prior to weaning, general body growth and maturation is stimulated without evidence of virilization or adverse effect on subsequent fertility. Moreover, unlike the androgenic steroids, the testololactones used according to this invention, do not have anabolic effects in the weaned or adult animal.

The differences in the nature of the results obtained with the androgenic, anabolic agents and the non-androgenic, growth promoting class of testololactones suggests a difference in mechanism of action. The effect of androgenic substances primarily on sex associated tissues suggests a direct and specific anabolic effect. The general stimulation evoked by the class of testololactones without virilization and/or sterilization suggests an indirect effect probably through the release or increased production of Pituitary Growth Hormone.

The non-androgenic testololactones which are used in the practice of this invention includes testololactone, $\Delta^1$-testololactone and A-nortestololactone. Simple derivatives of these compounds may also be used. Such derivatives are the 15-dehydro derivatives, keto derivatives, i.e., those having keto groups in the 11-, 15-, and 16-positions, hydroxy derivatives, i.e., $6\alpha$-hydroxy, $7\alpha$-hydroxy, $11\alpha$-hydroxy, $11\beta$-hydroxy, $15\alpha$-hydroxy and $16\alpha$-hydroxy derivatives and lower fatty acid esters of these hydroxylated derivatives, halo derivatives, particularly chloro or fluoro derivatives in which the halogen may be in the 9- and/or 16-positions. Illustrative are the following: $\Delta^1$-testololactone, 15-keto-testololactone, 15-dehydrotestololactone, 15-dehydro-$\Delta^1$-testololactone, $15\alpha$-hydroxy-$\Delta^1$-testololactone, testololactone, $11\alpha$-hydroxytestololactone, $11\alpha$-hydroxy-$\Delta^1$-testololactone, $11\beta$ - hydroxytestololactone, $11\beta$ - hydroxy-$\Delta^1$-testololactone, $7\alpha$-hydroxytestololactone, $6\beta$-hydroxytestololactone, and acetate and propionate esters of the foregoing hydroxy compounds: A-nortestololactone, $11\alpha$ - hydroxy - A-nortestololactone propionate, $11\alpha$-hydroxy-A-nortestololactone acetate, $11\alpha$ - hydroxy-A-nortestololactone enanthate and combinations of these compounds. In this group $\Delta^1$-testololactone, testololactone and A-nortestololactone are prefered, with the first being the compound of choice.

The growth promoting agents of this invention are administered orally or parenterally in formulations adapted for this purpose. For example, they may be dissolved or suspended in suitable compatible, pharmaceutically acceptable solvents or carriers for parenteral administration with or without a suitable preservative. Vegetable oils, such as sesame oil, corn oil, castor oil and the like are the preferred vehicles for parenteral administration, sesame oil being especially preferred. However, water solutions or suspensions may also be used. When required, the parabens provide suitable preservatives. Oral preparations such as tablets, powders or capsules may also be employed. These are prepared in conventional manner incorporating excipients, lubricants and other adjuvants as required. Forms which may be dissolved or suspended in drinking water are also contemplated.

To obtain the satisfactory results of this invention, the growth promoting agents must be employed in amounts from about 5 to about 500 mg. per kg. of body weight of the animal to be treated. Preferably, it has been found that a concentration which makes available about 50 to 300 mg. per kg., especially about 250 mg. per kg., of body weight of the animal being treated yields the most satisfactory results. In most instances a single dose accomplishes the result desired, although multiple doses, at daily intervals for about 7 to 10 days may also be used.

It has also been found that the successful practice of this invention relies to a great degree on the period after birth within the animal is treated. Most satisfactory results are obtained when the growth promoting agent is administered within the first 15 days after parturition, especially within the first 5 days.

It has also been surprisingly found that this invention may be successfuly practiced by administering the growth promoting agents to the pregnant mother prior to giving birth. It has been found that when the growth promoting agents of this invention are administered to a pregnant animal during the last half of the development period of the embryo, preferably in the last trimaster, an enhanced growth and development pattern is followed by the newborn animal. In the case of extra-uterine embryonic development, for example, in the eggs of chickens the growth promoting agents may be administered directly to the embryo in the last half of the period of embryonic development with satisfactory results. Thus this invention contemplates the treatment of animals with a growth promoting composition during the period from the beginning of the last half of embryonic development to within 15 days after the birth of the animal to be treated to obtain the enhanced growth pattern. One or more treatments may be used, although one is usually sufficient.

ed animals weigh twenty to thirty percent more than do the control animals of the same age.

TABLE 1.—AVERAGE BODY WEIGHT (GRAMS)
Mouse

| Treatment | Days Post Treatment | | | | | | | | | | | |
|---|---|---|---|---|---|---|---|---|---|---|---|---|
| | [1]0 | 15 | 18 | 24 | 27 | | 30 | | 36 | | 39 | |
| | | | | | Female | Male | Female | Male | Female | Male | Female | Male |
| Control | 1.8 | 6.8 | 8.0 | 12.6 | 14.6 | 16.2 | 17.2 | 19.5 | 21.0 | 24.0 | 23.0 | 25.2 |
| Δ¹-testololactone, 1.0 mg | 1.9 | 11.0 | 13.0 | 20.6 | 21.4 | 25.1 | 24.5 | 28.2 | 27.9 | 31.6 | 29.1 | 33.1 |

[1] Birth.

The invention may be further illustrated by the following examples:

EXAMPLE 1

Newborn Swiss albino mice are administered a single subcutaneous injection of 1.0 mg. of Δ¹-testololactone in 0.1 ml. of sesame oil within the first twenty-four hours after birth. Control mice of the same age are administered 0.1 ml. sesame oil. All pups of the same litter receive the same treatment. Approximately ten litters of ten pups each are employed for each treatment group and each litter and mother are housed separately. Litters are weighed twice weekly. The results are summarized in Table 1. At the age of thirty-nine days the treat-

EXAMPLE 2

The newborn mongrel (part Beagle) puppies from the same litter are divided into four treatment groups. Each group consists of a male and female with the exception of one group which consists of one female only. The animals are subcutaneously administered a single injection of Δ¹-testololactone (50 mg./kg.) or sesame oil within twenty-four hours after birth. Body weights are recorded twice weekly. Results of this study as recorded in Table 2 demonstrate that the single injection of Δ¹-testololactone increases the weight gain of the puppies. The increase from birth weight of the treated animals is approximately 200 percent greater than that of the control animals.

TABLE 2.—BODY WEIGHT (GRAMS)
Puppy

| Treatment | Sex | Birth Wt. | Days Post Treatment | | | | | | |
|---|---|---|---|---|---|---|---|---|---|
| | | | 3 | 10 | 16 | 18 | 21 | 24 | 27 |
| Control | M | 306 | 331 | 345 | 383 | 425 | 460 | 504 | 530 |
| | F | 263 | 290 | 270 | 320 | 327 | 360 | 386 | 423 |
| Δ¹-testololactone, 50 mg./kg. | M | 266 | | 492 | 741 | 866 | 1,012 | 1,172 | 1,150 |
| | F | 245 | 273 | 340 | 404 | 516 | 592 | 617 | 675 |

EXAMPLE 3

The procedure of Example 1 is followed with Sprague-Dawley rats. A control group of 119 animals is administered 0.1 ml. of sesame oil. One test group of 127 animals is administered 1.0 mg. of Δ¹-testololactone in 0.1 ml. of sesame oil. A second test group of 135 animals is administered 2.0 mg. of Δ¹-testololactone in 0.1 ml. of sesame oil. The results are summarized in Table 3.

TABLE 3.—AVERAGE BODY WEIGHT (GRAMS)
Rat

| | No. Rats | Days Post Treatment | | | | | | | | | | | | | | | |
|---|---|---|---|---|---|---|---|---|---|---|---|---|---|---|---|---|---|
| | | 0 | 4 | 7 | 10 | 15 | 18 | 21 | | 24 | | 27 | | 30 | | 33 | | 39 | |
| | | | | | | | | M | F | M | F | M | F | M | F | M | F | M | F |
| Control | 117 | 6.7 | 10.8 | 16.7 | 20.7 | 33.7 | 39.8 | 48.5 | 45.8 | 60.1 | 56.5 | 71.5 | 66.8 | 86.2 | 78.2 | 102.8 | 91.0 | 137.0 | 119.0 |
| Δ¹-testololactone (1.0 mg.) | 127 | 7.0 | 12.5 | 18.5 | 25.2 | 36.9 | 43.7 | 53.0 | 52.5 | 64.8 | 63.2 | 80.6 | 77.1 | 99.5 | 93.0 | 120.0 | 109.0 | 160.0 | 140.0 |
| Δ¹-testololactone (2.0 mg.) | 135 | 7.3 | 12.0 | 18.5 | 25.1 | 36.6 | 43.7 | 55.6 | 52.0 | 67.7 | 63.6 | 83.7 | 77.3 | 98.9 | 88.9 | 121.0 | 140.0 | 163.0 | 134.0 |

EXAMPLE 4

The procedure of Example 1 is followed with three groups of Swiss Albino (C D) mice except that each group receives its injection at day 7 of life. Table 4 summarizes the results.

TABLE 4.—AVERAGE BODY WEIGHT (GRAMS)
Swiss Albino (CD) Mice

| | No. Mice | Days of Life | | | | | | | | | | | | | | | | | |
|---|---|---|---|---|---|---|---|---|---|---|---|---|---|---|---|---|---|---|---|
| | | [1]0 | 4 | 7 | 10 | 15 | 18 | 21 | | 24 | | 27 | | 30 | | 33 | | 36 | | 39 | |
| | | | | | | | | M | F | M | F | M | F | M | F | M | F | M | F | M | F |
| Control | 79 | 1.8 | 3.3 | 4.6 | 5.7 | 6.8 | 8.0 | 10.0 | 8.9 | 12.6 | 11.6 | 16.2 | 14.6 | 19.5 | 17.2 | 22.2 | 19.6 | 24.0 | 21.0 | 25.2 | 23.0 |
| Δ¹-testololactone (1.0 mg.) | 26 | 2.1 | 4.1 | 5.0 | 6.4 | 7.7 | 9.3 | 12.0 | 11.6 | 15.5 | 15.0 | 19.8 | 18.4 | 23.2 | 21.2 | 25.0 | 22.9 | 27.0 | 23.5 | 27.8 | 24.1 |
| Δ¹-testololactone (0.1 mg.) | 19 | 2.0 | 3.6 | 4.7 | 6.1 | 7.5 | 8.9 | 11.6 | 11.8 | 14.8 | 14.2 | 19.1 | 17.6 | 22.8 | 20.6 | 24.8 | 21.8 | 26.0 | 23.0 | 27.5 | 24.1 |

[1] Birth.

EXAMPLE 5

Pregnant Swiss Albino mice at day 14 of gestation or pregnant Sprague Dawley rats at day 12, 13, 14 or 15 of gestation are administered one subcutaneous injection of 0.1 ml. of sesame oil without (control) or with $\Delta^1$-testololactone as indicated in Table 5. The offspring are weighed at birth, segregated and then weighed periodically thereafter. All animals are kept clean, with water and food available to the nursing mothers as libitum. The results are summarized in Table 5.

TABLE 5.—AVERAGE BODY WEIGHT OF OFFSPRING (GRAMS)

Swiss Albino Mice

| | No. Animals | Days of Life | | | | | | 21 | | 24 | | 27 | | 30 | | 33 | | 36 | | 39 | |
|---|---|---|---|---|---|---|---|---|---|---|---|---|---|---|---|---|---|---|---|---|---|
| | | 1 0 | 4 | 7 | 10 | 15 | 18 | M | F | M | F | M | F | M | F | M | F | M | F | M | F |
| Control | 79 | 1.8 | 3.3 | 4.6 | 5.7 | 6.8 | 8.0 | 10.0 | 9.5 | 12.6 | 11.6 | 16.2 | 14.6 | 19.5 | 17.2 | 22.2 | 19.6 | 24.0 | 21.0 | 25.2 | 23.0 |
| $\Delta^1$-testololactone (10 mg.) | 35 | 1.7 | 3.3 | 4.7 | 6.1 | 7.9 | 9.4 | 12.3 | 12.1 | 15.9 | 14.7 | 19.8 | 18.0 | 23.4 | 20.7 | 24.9 | 22.3 | 28.2 | 23.7 | 28.6 | 24.1 |
| $\Delta^1$-testololactone (1 mg.) | 46 | 1.9 | 3.7 | 5.1 | 6.1 | 7.0 | 8.4 | 10.4 | 9.8 | 13.5 | 12.2 | 16.6 | 14.6 | 20.2 | 17.6 | 23.0 | 19.9 | 25.1 | 22.1 | 26.3 | 23.2 |

Rats

| | No. Animals | 1 0 | 4 | 7 | 10 | 15 | 18 | 21 | 24 | 27 | 30 | 33 | 36 | 39 |
|---|---|---|---|---|---|---|---|---|---|---|---|---|---|---|
| Control | 25 | | | | 8.1 | | 12.2 | 18.8 | 26.1 | 31.1 | 36.3 | 46.3 | 61.1 | 82.0 |
| $\Delta^1$-testololactone (10 mg.) | 11 | | | | 8.2 | | 14.4 | 20.7 | 26.7 | 33.0 | 41.0 | 62.0 | 77.0 | 103.0 |
| $\Delta^1$-testololactone (1 mg.) | 39 | | | | 7.2 | | 11.7 | 17.4 | 23.0 | 30.3 | 38.6 | 51.3 | 64.7 | 90.0 |

¹ Birth.

What is claimed is:

1. The method of enhancing the growth of animals which comprises injecting the pregnant mother in the last trimester of pregnancy with a composition comprising about 50 to about 300 mg. per kg. of $\Delta^1$-testololactone, testololactone, A - nortestololactone, 15 - ketotestololactone, 15 - dehydrotestololactone, 15 - dehydro - $\Delta^1$ - testololactone, 15$\alpha$ - hydroxy - $\Delta^1$ - testololactone, 11$\alpha$ - hydroxytestololactone, 11$\alpha$ - hydroxy - $\Delta^1$ - testololactone, 11$\beta$ - hydroxytestololactone, 11$\beta$ - hydroxy - $\Delta^1$ - testololactone, 7$\alpha$ - hydroxytestololactone, 6$\beta$ - hydroxytestololactone, the acetate or propionate ester of the foregoing hydroxy compounds, 11$\alpha$ - hydroxy - A - nortestololactone propionate, 11$\alpha$ - hydroxy - A - nortestololactone acetate or 11$\alpha$-hydroxy-A-nortestololactone enanthate.

2. The method of claim 1 wherein the composition comprises about 250 mg. per kg. of $\Delta^1$-testololactone.

3. The method of enhancing the growth of animals which comprises administering to the embryo in the last half of the embryonic period of development a composition comprising about 50 to about 300 mg. per kg. of testololactone, $\Delta^1$ - testololactone, A - nortestololactone, 15 - ketotestololactone, 15 - dehydrotestololactone, 15-dehydro - $\Delta^1$ - testololactone, 15$\alpha$ - hydroxy - $\Delta^1$ - testololactone, 11$\alpha$ - hydroxytestololactone, 11$\alpha$ - hydroxy - $\Delta^1$- testololactone, 11$\beta$ - hydroxytestololactone, 11$\beta$ - hydroxy- $\Delta^1$ - testololactone, 7$\alpha$ - hydroxytestololactone, 6$\beta$ - hydroxytestololactone, the acetate or propionate ester of the foregoing hydroxy compounds, 11$\alpha$ - hydroxy - A - nortestololactone propionate, 11$\alpha$ - hydroxy - A - nortestololactone acetate or 11$\alpha$ - hydroxy - A - nortestololactone enanthate.

4. The method of claim 3 wherein the composition comprises about 250 mg. per kg. of $\Delta^1$-testololactone.

5. The method of promoting the growth of animals which comprises injecting the newborn animal within fifteen days of birth with a composition comprising about 50 to about 300 mg. per kg. of tesotlolactone, $\Delta^1$-testololactone, A - nortestololactone, 15 - ketotestololactone, 15-dehydrotestololactone, 15 - dehydro - $\Delta^1$ - testololactone, 15$\alpha$ - hydroxy - $\Delta^1$ - testololactone, 11$\alpha$ - hydroxytestololactone, 11$\alpha$ - hydroxy - $\Delta^1$ - testololactone, 11$\beta$ - hydroxytestololactone, 11$\beta$ - hydroxy - $\Delta^1$ - testololactone, 7$\alpha$ - hydroxytestololactone, 6$\beta$ - hydroxytestololactone, the acetate or propionate ester of the foregoing hydroxy compounds, 11$\alpha$ - hydroxy - A - nortestololactone propionate, 11$\alpha$ - hydroxy - A - nortestololactone acetate or 11$\alpha$-hydroxy-A-nortestololactone enanthate.

6. The method of claim 5 wherein the composition comprises about 250 mg. per kg. of $\Delta^1$-testololactone.

References Cited

UNITED STATES PATENTS

| 2,868,809 | 1/1959 | Donia et al. | 260—397.4 |
| 2,998,423 | 8/1961 | De Wit et al. | 99—2 X |
| 3,016,388 | 1/1962 | De Wit et al. | 99—2 X |

OTHER REFERENCES

Physicians Desk Reference (PDR) 1956, p. 533.

Recent Progress in Hormone Research (1958), Gassner et al., pp. 198–209.

Merck Index, 7th Ed., 1960, pp. 1018–19.

Lerner et al., $\Delta'$-testolactone, A Nonandrogenic Augmentor and Inhibitor of Androgens. Cancer, vol. 13, No. 6, November–December 1966, pp. 1201–1205.

FRANK CACCIAPAGLIA, Jr., Primary Examiner